Dec. 31, 1929.                W. WELSCH                1,742,112
DYNAMO ELECTRIC MACHINE ARMATURE
Filed March 9, 1928
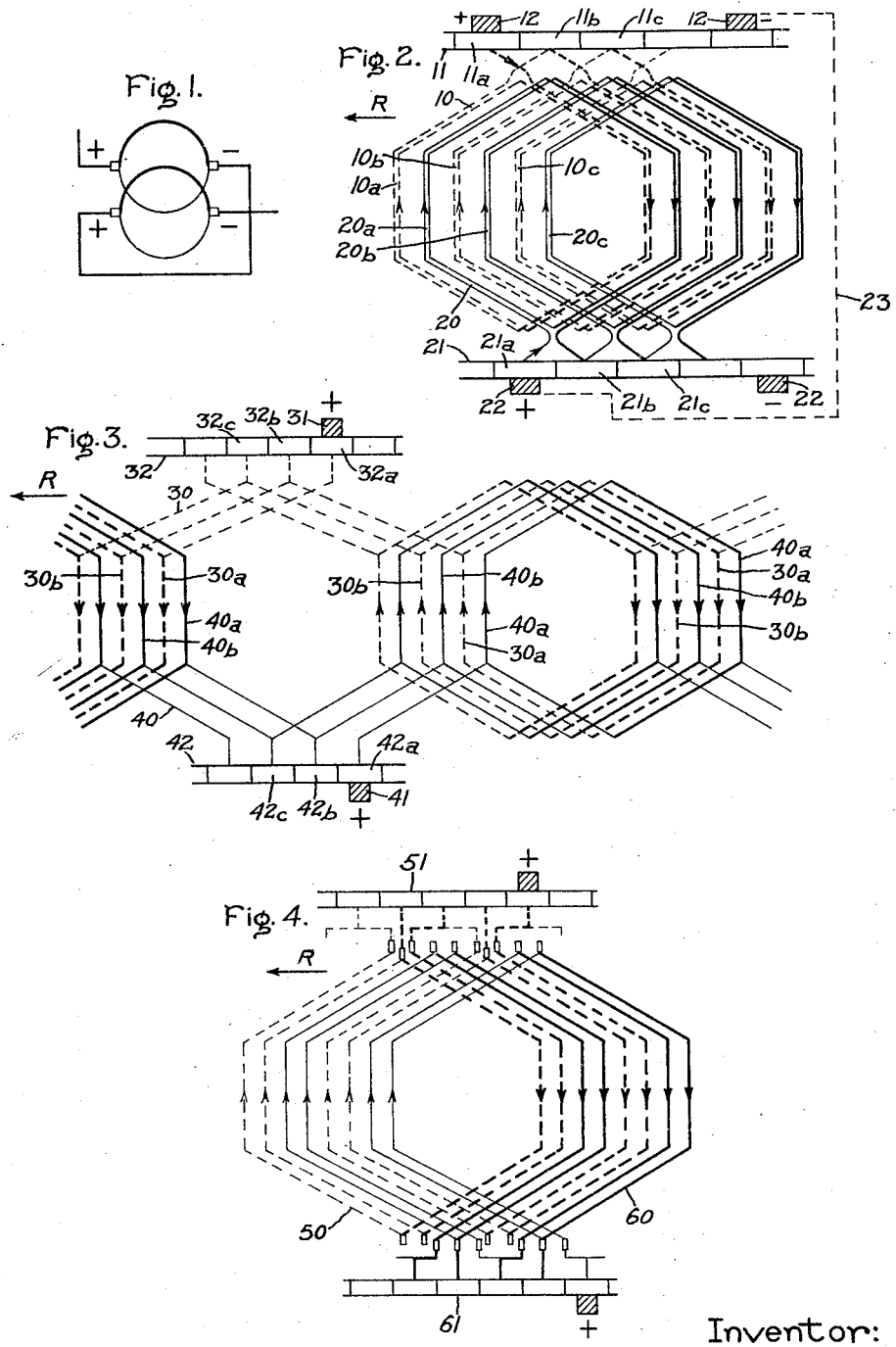
Inventor:
Wilhelm Welsch,
by Charles E. Tullar
His Attorney Patented Dec. 31, 1929

1,742,112

UNITED STATES PATENT OFFICE

WILHELM WELSCH, OF BERLIN-NIEDERSCHONHAUSEN, GERMANY, ASSIGNOR TO GENERAL ELECTRIC COMPANY, A CORPORATION OF NEW YORK

DYNAMO-ELECTRIC-MACHINE ARMATURE

Application filed March 9, 1928, Serial No. 260,492, and in Germany March 17, 1927.

My invention relates to dynamo-electric machine armatures of the double commutator type having two separate windings, each of which is connected to one of the commutators.

In building these armatures it has been the practice heretofore to make both of the windings of the same progression (right or left) as viewed from the commutator to which it was connected so that the progression of each winding with respect to the direction of rotation of the machine was opposite to the progression of the other. In this construction when the coil side of one winding was in the neutral zone, it was of the opposite polarity to the adjacent coil side of the other winding so that the brushes to which they directly led in this position of the armature were of opposite polarity. As a result, the voltage difference between this part of the windings was a maximum and decreased to a minimum at a point about midway between adjacent brushes of the same commutator. Such a distribution of the voltage difference between the windings was particularly disadvantageous when the separate windings were connected in series, as in this case it is apparent that the voltage difference between a portion of the windings may be as great as the total voltage across both armatures.

The object of my invention is to arrange the windings of a double commutator armature in such relation that the voltage difference between the windings will be substantially constant at all portions thereof whether the armatures are connected in separate circuits, or in the same circuit in series or parallel. I accomplish this by making the progression of each winding in the same direction with respect to the direction of rotation of the armature.

My invention will be more fully set forth in the following description referring to the accompanying drawing and the features of novelty which characterize my invention will be pointed out with particularity in the claims annexed to and forming a part of this specification.

In the drawing, illustrating diagrammatically my improved armature as employed in a motor, Fig. 1 shows the connections between the brushes for connecting the separate windings in series: Figs. 2 and 3 show a lap and wave winding respectively, embodying my invention, and Fig. 4 shows a lap winding similar to Fig. 2 having one turn per coil.

Referring to the drawing, the armatures shown therein are provided with two separate windings having commutators at opposite ends thereof, the connections from the commutators to the external circuits being made through brushes in the usual manner, which are shown of the polarity they would be if the armatures were in a motor.

In accordance with my invention, the voltage difference between the separate windings is minimized by making them of the same progression with respect to the direction of rotation of the armature. Fig. 2 shows an armature made in this manner and comprising two separate simple lap windings 10 and 20 having two turns per coil. The winding 10 which is shown in dotted lines, is connected to the commutator 11 having brushes 12 bearing thereon. The winding 10 is arranged so that in the position of the armature shown, current flows from the positive brush 12 through commutator segment $11^a$, the coil $10^a$, commutator segment $11^b$, coil $10^b$, commutator segment $11^c$ and coil $10^c$. The winding 20, which is shown in full lines, is connected to the other commutator 21 having brushes 22 bearing thereon. This winding is arranged so that in position of the armature shown, current flows from the positive brush 22 through commutator segment $21^a$, coil $20^a$, commutator segment $21^b$, coil $20^b$, commutator segment $21^c$ and coil $20^c$. From the foregoing, it is clear that both of the windings 10 and 20 are of the same progression with respect to the direction of rotation of the armature indicated at R, and as a result the brushes 12 and 22 of the same polarity, which are both shown as being positive, lead directly to coils $10^a$ and $20^a$ having their sides adjacent or in the same slot. The negative brush 12 is connected to the positive brush 22, as shown at 23, so that the armature can be connected across a circuit of twice the voltage of one of the windings. When the armature is connected across a circuit in this manner, the voltage of the winding 10 varies uniformly from the voltage of the system at the positive brush 12 to half this voltage at the negative brush 12. The voltage of the winding 20 varies uniformly from half the voltage of the system at the positive brush 22 to zero at the negative brush 22. Inasmuch as the voltage in each winding varies in the same direction from a maximum to a minimum, the voltage between the windings 10 and 20 is, uniformly throughout, half the voltage of the system, as compared with variations from full voltage of the system to zero voltage in double commutator armatures as heretofore constructed.

When the windings 10 and 20 are connected in parallel, it is apparent that the voltage varies from the positive brushes 12 and 22 through the winding to the negative brushes 12 and 22 so that the voltage difference between the windings 10 and 20 will be substantially zero, as compared to a voltage difference equal to the voltage across the armature and varying to zero at a point about midway between the brushes in the usual winding arrangement in which the separate windings are of opposite progression with respect to the direction of rotation of the armature.

Fig. 3 shows my invention applied to a double commutator armature provided with two separate wave windings 30 and 40 having two turns per coil. These windings are connected to commutators 32 and 42, respectively, having positive and negative sets of brushes 31 bearing thereon, the negative brushes not being shown. In this construction, as shown in dotted lines in the drawing, the winding 30, which is connected to commutator 32, is arranged so that it progresses in the direction of rotation of the armature indicated at R. This can be readily seen by tracing the winding, which includes a circuit from the positive brush 31 through commutator segment $32^a$, coil $30^a$ and commutator segment $32^b$. From segment $32^b$ the circuit through the winding includes coil $30^b$ and segment $32^c$. The winding 40, which is shown in full lines, is made up of a plurality of two turn coils connected to the commutators 42 and is also arranged so as to progress in the direction of rotation of the armature indicated at R. This will become apparent by tracing the armature circuit from the positive brush 41 through the winding which comprises segment $42^a$, coil $40^a$ and segment $42^b$. From segment $42^b$ the circuit comprises, coil $40^b$ and commutator segment $42^c$. It is to be noted that the portion of the coils $30^a$, $30^b$ and $40^a$, $40^b$ to the right of Fig. 3, are duplicated in the left hand portion of the figure to aid in understanding the drawing. It will now be apparent that as the windings 30 and 40 progress in the same direction with respect to the direction of rotation of the armature, that the coils $30^a$ and $40^a$, which are adjacent or in the same slots, are put in circuit directly with brushes of the same polarity at their respective commutators at the same time, so that the advantage of substantially constant voltage difference between the adjacent coils of the windings 30 and 40 is the same as described in connection with Fig. 2.

The armature diagrammatically shown in Fig. 4 is like the double commutator armature having two separate lap windings shown in Fig. 2, except that each winding is made of single turn coils. This armature includes a lap winding 50, shown in dotted lines, and a lap winding 60, shown in full lines, which are connected to commutators 51 and 61, respectively. The winding 50 is made of the same progression with respect to the direction of rotation of the armature, indicated at R, as the progression of winding 60, so that the coils adjacent or in the same slots are brought under brushes of the same polarity at the same time. This makes the voltage difference between the windings the same throughout, as will be readily understood from the detailed description of Fig. 2.

Although my invention has been shown as applied to simple lap or wave windings, it is apparent that it can be applied as well to multiplex windings. I do not therefore desire my invention to be limited to the specific construction shown and described, except as defined in the appended claims.

What I claim as new and desire to secure by Letters Patent of the United States, is:

1. In a dynamo-electric machine, an armature having a commutator at each end thereof and two separate windings, each of said windings being connected to one of said commutators and progressing in the same direction with respect to the direction of rotation of said armature, brushes bearing on each of said commutators, and means including said brushes for connecting said windings in series.

2. In a dynamo-electric machine, an armature having a commutator at each end thereof with brushes bearing thereon and two separate windings, each of said windings being connected to one of said commutators and having a coil leading to a brush of the same polarity as a brush of the other commutator to which the adjacent coil of the other windings leads, and means including said brushes for connecting said windings in series.

In witness whereof, I have hereto set my hand this 18th day of February, 1928.

WILHELM WELSCH.